No. 863,035. PATENTED AUG. 13, 1907.
A. MAUL.
DEVICE FOR MAINTAINING INSTRUMENTS IN ADJUSTED POSITIONS.
APPLICATION FILED MAY 17, 1906.
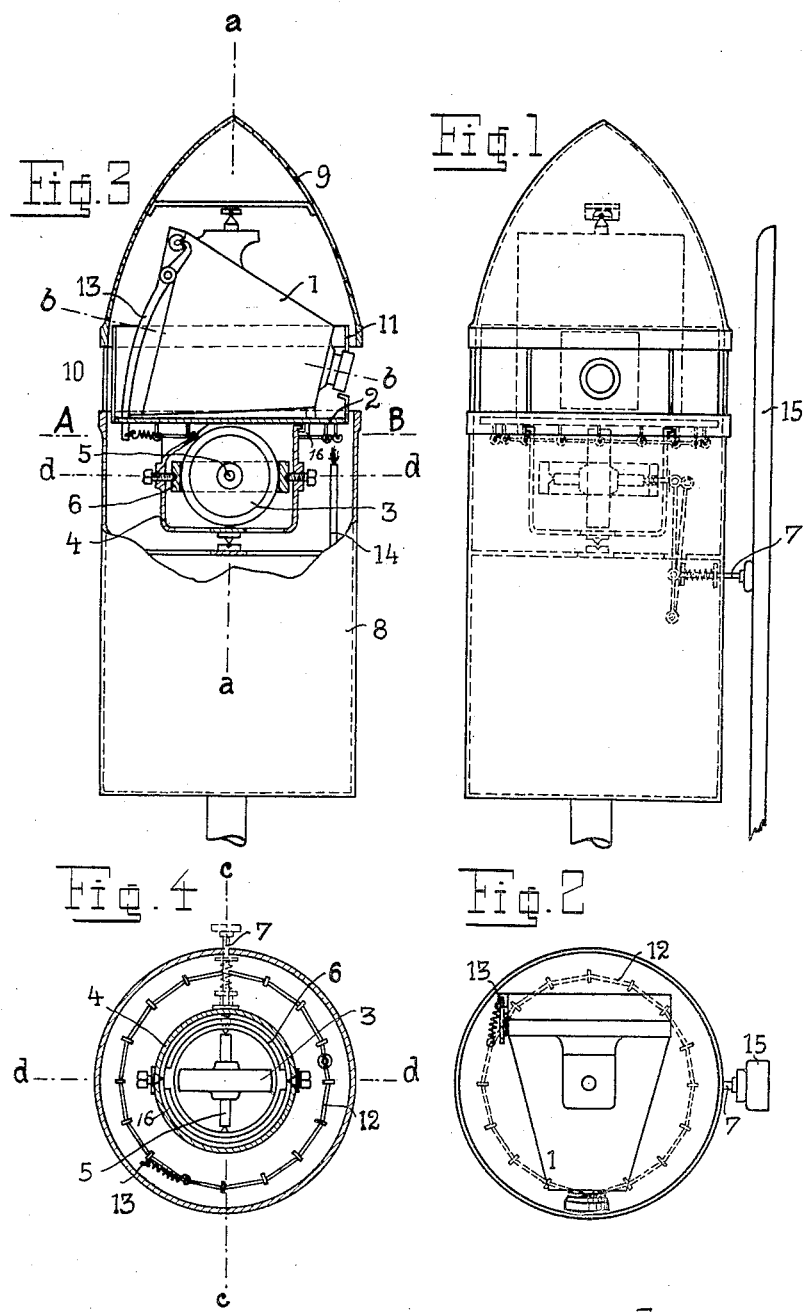
Witnesses:—
Inventor:—
Alfred Maul
by
his attorney

UNITED STATES PATENT OFFICE.

ALFRED MAUL, OF DRESDEN, GERMANY.

DEVICE FOR MAINTAINING INSTRUMENTS IN ADJUSTED POSITIONS.

No. 863,035.  Specification of Letters Patent.  Patented Aug. 13, 1907.

Application filed May 17, 1906. Serial No. 317,327.

*To all whom it may concern:*

Be it known that I, ALFRED MAUL, a subject of the German Emperor, and residing at Dresden, Germany, have invented certain new and useful Improvements in Devices for Maintaining Instruments in Adjusted Positions, of which the following is a specification.

The subject of my invention is a device for maintaining an instrument in the position in which it has been adjusted, and is particularly applicable to apparatus, which, for the purpose of obtaining photographs of surrounding country, is projected into the air.

The device consists of a vertical flywheel connected with the instrument and mounted so as to turn on two horizontal axes located at right angles to each other. After the instrument has been adjusted, the flywheel is caused to rotate at a very high speed, and since it is suspended by means of a universal joint, the instrument will be prevented from revolving on its vertical axis.

The invention is illustrated in the accompanying drawing, which shows its application to an apparatus for photographing surrounding country and adapted to be projected into the air.

Figure 1 is an elevation; Fig. 2 is a plan with hood removed; Fig. 3 a side elevation and part vertical section; Fig. 4 a cross section on the line A—B of Fig. 3.

2 is a plate to the one side of which there is connected the photographic apparatus 1, and to the other side the housing 4 for the flywheel 3. The shaft 5 of the vertical flywheel 3 is mounted in the ring 6, which latter is rotatably mounted in the housing 4. The two horizontal axes of rotation, viz. that of the flywheel 3 c—c and that of the ring 6 d—d lie at right angles to each other. For fixing the ring 6 until the flywheel 3 has been set in rotation, a spring controlled stop-pin 7 is provided. Since this stop-pin, in order that it may be actuated, must always bear against one of the guide-bars 15 of the frame in which the device is supported before being shot into the air (technically known as the shooting frame), and since the photographic apparatus must be capable of being adjusted in all directions, it is necessary that flywheel and photographic apparatus be capable of being turned relatively to one another. For this purpose the housing 4 is mounted in a ring 16 secured to the plate 2, in which ring it may be rotatably adjusted in either direction and secured in any adjustment by any suitable means. The apparatus is incased in a cylindrical shell or casing 8 to which is attached a conical hood 9 by means of slight bars 10 leaving a substantially uninterrupted opening all around the apparatus for the accommodation and exposure of the photographic lens in all adjustments.

The photographic apparatus and the flywheel are rotatably mounted in the vertical axis a—a of the device. A casing 11 secured to the plate 2 serves to protect the photographic apparatus, this casing 11 covering the whole of the aperture 10 of the shell except the hole for the lens.

The instantaneous shutter of the photographic apparatus may be released in any suitable manner, in this instance a time fuse arrangement being shown comprising a spring-actuated releasing lever 13 pivoted to the photographic apparatus and extending downward therefrom to about the level of a combustible cord 12 concentrically arranged about the longitudinal axis a—a of the apparatus. Mounted fixedly with relation to the shell 8 of the apparatus and in the arc of the cord 12, so that it will be properly positioned with relation to said cord in every adjustment of said cord and its support, is a match or fuse 14. The fuse, which is to be ignited by any suitable means at the time of projecting the device, may be of any suitable and well known construction. As shown, it consists of a hollow, incombustible tube, the contents of which, lighted from below, will be slowly consumed, the flame issuing at the top at the end of a pre-determined burning period and destroying the continuity of cord 12, thereby releasing lever 13 and causing operation of the shutter to which the lever is connected by any suitable means.

The method of using the apparatus is as follows:— The lens is adjusted in the direction in which the photograph is to be taken (axis b—b) and the apparatus so set in its frame that the stop-pin 7 is pressed by the bar 15 into the ring 6. Thereupon the rocket (if such is used as elevating means) is ignited, after the flywheel has been set in rotation by appropriate means. Immediately the apparatus has left the shooting frame in which it has been set, the stop-pin 7 will be retracted from the ring 6 by its spring and the flywheel is thus able to operate. The photographic apparatus, owing to the action of the universal-joint suspension of the flywheel, will not be able to turn out of the direction in which it has been set, though the outer shell of the device is free to revolve about the photographic apparatus. At the right moment the shutter is released by the quick-match 14—always located below the cord 12—whereupon the apparatus can descend. Suitable contrivances for regulating the fall may be provided in the lower part of the apparatus.

What I claim is:—

1. In an apparatus adapted to be projected into the air, the combination with the shell thereof, of a photographic apparatus therein rotatable on an axis held continuously in the longitudinal axis of said shell, and means for maintaining the photographic apparatus fixed against change of focal direction without regard to the turning of the projectile on its longitudinal axis during its flight, substantially as set forth.

2. In an apparatus adapted to be projected into the air, the combination with the shell thereof, of a photographic apparatus therein rotatable on an axis held continuously in the longitudinal axis of said shell, and means for maintaining the photographic apparatus fixed against change of focal direction without regard to the turning of the projectile on its longitudinal axis during its flight, said means being carried by the frame of the photographic apparatus, substantially as set forth.

3. In an apparatus adapted to be projected into the air, the combination with the shell thereof, of a photographic apparatus therein rotatable on an axis held continuously in the longitudinal axis of said shell, and means for maintaining the photographic apparatus fixed against change of focal direction without regard to the turning of the projectile on its longitudinal axis during its flight, said means being adjustable with relation to the photographic apparatus, substantially as set forth.

4. In an apparatus adapted to be projected into the air, the combination with the shell thereof, of a photographic apparatus therein rotatable on an axis held continuously in the longitudinal axis of said shell, and means for maintaining the photographic apparatus fixed against change of focal direction without regard to the turning of the projectile on its longitudinal axis during its flight, said means being adjustable about the longitudinal axis of the projectile and photographic apparatus, substantially as set forth.

5. In an apparatus adapted to be projected into the air, the combination with the shell thereof, of a photographic apparatus therein rotatable on an axis held continuously in the longitudinal axis of said shell, and means for maintaining the photographic apparatus fixed against change of focal direction without regard to the turning of the projectile on its longitudinal axis during its flight, said means being carried by the frame of the photographic apparatus and adjustable about the longitudinal axis thereof, substantially as set forth.

6. In an apparatus adapted to be projected into the air, the combination with the shell thereof, of a photographic apparatus therein rotatable on an axis held continuously in the longitudinal axis of said shell, and means for maintaining the photographic apparatus fixed against change of focal direction with regard to the turning of the projectile on its longitudinal axis during its flight, and means normally holding the photographic apparatus against rotation on its longitudinal axis in the shell automatically released by the projection into the air, substantially as set forth.

7. In an apparatus adapted to be projected into the air, the combination with the case thereof provided with a substantially continuously open zone or belt, of a photographic apparatus within the casing freely rotatable on the longitudinal axis thereof and having its lens directed through said zone, and means whereby the focal direction of the lens is maintained during the flight of the projectile without regard to any rotation of the latter on its longitudinal axis, substantially as set forth.

8. In an apparatus adapted to be projected into the air, the combination with the case thereof, of a photographic apparatus within the case and freely rotatable on the longitudinal axis thereof, a ring carried by the photographic apparatus and freely rotatable about an axis at a right angle to the longitudinal axis of the projectile proper, and a fly wheel rotatable in said ring on an axis at a right angle to that of the ring, substantially as set forth.

9. In an apparatus adapted to be projected into the air, the combination with the case thereof, of a photographic apparatus within the case and freely rotatable on the longitudinal axis thereof, a ring carried by the photographic apparatus and freely rotatable about an axis at a right angle to the longitudinal axis of the projectile, means for adjusting the support of the ring in a plane at a right angle to the axis of the projectile, and a fly wheel rotatable in said ring on an axis at a right angle to that of the ring, substantially as set forth.

10. In a device for maintaining instruments in the position in which they have been adjusted, when projected into the air, in combination, a photographic apparatus having a shutter; a spring-actuated lever controlling the latter; a shell containing the apparatus; a flywheel, suspended by means of a universal joint, secured to the apparatus, the said flywheel and apparatus being mounted integrally in the vertical axis of the shell with capability of rotation; a flexible member of combustible material holding the said shutter-lever in a state of tension; and a quick-match located in the shell below the said combustible member, substantially as described.

In testimony whereof I affix my signature in presence of two witnesses.

ALFRED MAUL.

Witnesses:
CHEMNITZ H. SCHILLING,
PAUL ARRAS.